3,418,397
ULTRA-VIOLET LIGHT STABILIZED POLYMERS
Stanley Tocker, Wilmington, Del., assignor to E. I. du Pont de Nemours and Company, Wilmington, Del., a corporation of Delaware
No Drawing. Filed Aug. 12, 1963, Ser. No. 301,638
6 Claims. (Cl. 260—900)

This invention relates to polymeric compositions and processes for their preparation and more particularly to photostable polymers derived from polystyrene polymers and processes for their preparation.

Various organic compounds exhibit the power to absorb light rays within the region of 2900 to 3900 A. When uniformly distributed throughout a transparent plastic sheet, the resultant sheet acts as a filter for all light rays passing through and will transmit only that radiation which is not absorbed by the sheet and/or the absorbing agent. Thus, it is possible to screen out undesirable light rays and utilize the resulting filter in many technical and commercial applications such as in plastic glazing materials for use in green houses, perforated window screens, farm buildings, etc.

Enjoying at least some measure of success as photostabilizers for polymeric materials are the substituted benzophenone derivatives having the formula

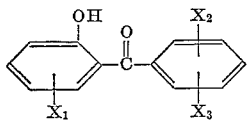

wherein $X_1$, $X_2$ and $X_3$ each represent a hydrogen or halogen atom or a hydroxyl, alkyl, or alkoxy group.

The use of these compounds, however, as photostabilizers for organic polymeric materials, has several serious drawbacks. When blended into the polymer system, the photostabilizer (1) has a tendency to exude or migrate to the surface of the polymer structure and thereupon bleed out of the system, (2) often cannot be incorporated into the polymeric material to be photostabilized due to volatility of the absorber during hot mixing and (3) often cannot be incorporated into the polymer structure in the concentrations desired due to (1) or (2) above.

It is an object of this invention, therefore, to provide a new class of photostable polymeric compositions having increased resistance to the deleterious effects of ultraviolet light.

It is a further object of this invention to provide an economical one-step process for the preparation of photostable polymeric composition having increased resistance to the deleterious effects of the ultraviolet light.

A further object of this invention is to provide photostable polymers derived from polystyrene polymers which are stable when extruded and do not lose their ultraviolet light absorbent character by the migration of materials to the surface. These and other objects will appear hereinafter.

Briefly stated, the process of the present invention comprises reacting a styrene based polymer with salicyloyl chloride in an inert solvent or swelling agent for the reactants such as carbon disulfide or nitrobenzene in the presence of catalytic amounts of a Lewis acid type catalyst such as aluminum chloride, boron trifluoride, stannic chloride, and titanium tetrachloride under conditions o vigorous agitation and preferably at a temperature maintained between 0 and 60°. The resulting product is a polymeric chelate having at least 10%, preferably 10% to 100%, of the recurring styrene or substituted styrene benzene units converted to substituted o-hydroxybenzophenone units.

In the most preferred aspect of this invention polystyrene is reacted with salicyloyl chloride in the presence of aluminum chloride in carbon disulfide as the solvent medium.

In addition to polystyrene itself, other styrene polymers which can be reacted with salicyloyl chloride to form vinyl o-hydroxybenzophenone systems are polymers of the formula:

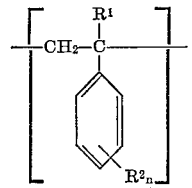

wherein $R^1$ is selected from the group consisting of hydrogen, halogen and alkyl and $R^2$ is selected from the group consisting of hydrogen, hydroxy, alkoxy, alkyl and halogen and $n$ is a positive integer of from 1 to 3 inclusive. Examples of such compounds are poly (alphachlorostyrene), poly (alphabromostyrene), poly (m-hydroxystyrene), poly (o-hydroxystyrene), poly (p-hydroxystyrene), poly (1,4-dimethyl-2-hydroxystyrene), poly (3-methoxy-4-hydroxystyrene), poly (1,5-dimethyl-2-hydroxystyrene), poly (1,4-dihydroxystyrene), poly (3,5-dibromo-4-hydroxystyrene), poly (alpha-methylstyrene), etc.

Additionally, copolymers of styrene or copolymers involving any of the styrene polymers listed above can be utilized. A preferred example is a copolymer of styrene and alpha-methyl styrene in a 50/50 weight percent ratio.

The polystyrene or substituted polystyrene is reacted with the salicycloyl chloride in a ratio of about at least 0.5 mol of salicyloyl chloride per monomeric unit of the polystyrene.

The catalyst employed in carrying out this reaction is a Lewis acid catalyst such as aluminum chloride, boron trifluoride, stannic chloride or titanium tetrachloride. The preferred catalyst is aluminum chloride. About 2 mols of catalyst per mol of salicyloyl chloride used is employed in the reaction.

The reaction is carried out at the temperature of about 0 to 60° C. under conditions of vigorous agitation.

When this reaction is conducted under the conditions described, a polymeric compound having at least 10% (preferably at least 50%) of the polystyrene units converted to polymerized vinyl o-hydroxybenzophenone containing units is obtained. This vinyl o-hydroxybenzophenone substituted structural unit can be illustrated as follows:

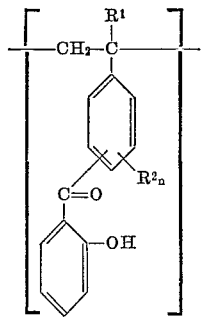

wherein $R^1$ is alkyl, halogen or hydrogen and $R^2$ is hydrogen, hydroxy, alkoxy, alkyl or halogen and $n$ is a positive integer from 1 to 3 inclusive.

The photostable polymers prepared by the present process can be blended or extruded with other nonfibrous and fibrous polymeric materials to form weatherdurable shaped structures, e.g., films. Of particular interest are the alphaolefins, e.g., polymers and copolymers of ethylene etc. and the polar vinylidene monomers characterized by the formula:

wherein $R^1$ is selected from one of the following groups:

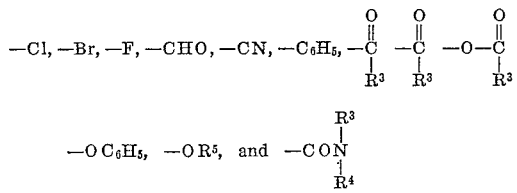

and wherein $R^3$ and $R^4$ are each selected from the group consisting of alkyl and hydrogen, $R^5$ is alkyl, and wherein $R^2$ is selected from the group consisting of $R^1$, hydrogen and alkyl of 1–4 carbon atoms. Examples of such materials are polyethylene, polyacrylonitrile, polyvinyl fluoride, polyvinylidene fluoride, polyvinyl acetate, polymethylacrylate, polyacrylamide, polymethylmethacrylate and polyvinyl chloride.

The principles and practice of the present invention will now be further described and illustrated by the examples to follow.

The determination of the structure of the compounds prepared by the present process is accomplished by Infrared Spectral Techniques [1] known to those skilled in ---
[1] W. M. D. Bryant and R. C. Voter, Journal of American Chemical Society, 75 6113 (1963).
F. W. Billmeyer, "Textbook of Polymer Chemistry," chapter 7, Interscience Publishers, 1957.

--- the art. The majority of the Infrared Spectral were taken on pressed film by the use of a Perkin-Elmer Model 21 Spectrophotometer and a Perkin-Elmer Infracord Spectrophotometer.

EXAMPLE 1

In a three-necked flask equipped with a stirrer, dropping funnel, condenser and drying tube are placed 40 g. (0.3 mol) aluminum chloride and 250 ml. carbon disulfide. The stirred mixture is treated over a 20 minute period with a solution of 10.4 g. (0.1 mol) polystyrene, 23.4 g. (0.15 mol) salicyloyl chloride, and 250 ml. carbon disulfide at room temperature. After addition is completed, the mixture is stirred for two hours at reflux temperature. The reaction mixture is filtered through a Buchner funnel, and the solid polymer dried in a vacuum oven at 35–40° C. The polymer is then washed in an Osterizer successively with 5% aqueous hydrochloric acid and water, followed by drying in a vacuum oven.

A 3 mil film is prepared by pressing one square inch of the polymer at 175° C. using 25 tons of pressure. Ultraviolet analysis shows the presence of a strong maximum at 3400 A., indicating the presence of a substituted ortho-hydroxybenzophenone. Infrared analysis, based on the chelated carbonyl band at 1650 cm.$^{-1}$, shows that 70% of the styrene units of the polymer are condensed with the salicyloyl chloride to give molecularly bound ortho-hydroxybenzophenone units.

When 0.3 mol of boron trifluoride is used in place of aluminum chloride as catalyst, 11% of the styrene units are converted.

EXAMPLE 2

The reaction and film preparation are carried out in the same manner as described in Example 1, using aluminum chloride as a catalyst, except for the substitution of 0.1 mol of poly (alpha-methyl styrene) for polystyrene.

Spectroscopic analysis carried out as described in Example 1 shows that over 72% of the alpha-methyl styrene units underwent reaction to give molecularly bonded ortho-hydroxybenzophenone units.

EXAMPLE 3

The reaction and film preparation are carried out in the same manner as described in Example 1 using aluminum chloride as catalyst, except that 0.1 mol poly/parachlorostyrene is used in place of the polystyrene. Spectroscopic analysis shows that 76% of the parasubstituted styrene units of the polymer underwent reaction to give bonded orthohydroxybenzophenone units.

EXAMPLE 4

Two grams of particulate polyvinyl fluoride in 20 ml. gamma-butyrolactone (10% solids dispersion) is prepared and mixed intimately with 0.04 g. of the condensate polymer of Example 1. The stirred mixture is heated to 100° C. in a beaker and is then poured on a glass plate preheated to 145° C. in an oven. The solvent is removed by drying at 145–150° C. The resultant 1.5–3 mil film contains 2 weight percent of the additive described in Example 1 as determined by infrared analysis. The film is as transparent as a poly (vinyl fluoride) control prepared as above but without the additive, indicating that the additive is compatible with the fluoride polymer.

EXAMPLE 5

A piece of the blended film from Example 4 and a similar piece of unblended polyvinyl fluoride control film, prepared as above except for the omission of the condensate of Example 1, are stapled to similar pieces of newspaper. These film-paper combinations are then exposed to a bank of Westinghouse F-S sunlamps for 300 hours, with the film sides facing the light. The newspaper behind the polyvinyl fluoride blend film is unchanged in appearance while that exposed behind the unmodified control is yellow and cracked, which demonstrates that incorporation of the described UV filtering composition into a coating can protect a degradable substrate.

This experiment shows that blends of polymers with minor amounts of the new compositions disclosed herein can be used to screen damaging radiation. Additionally, such blends can be laminated or glued to a variety of substrates, and the built-in permanent ultra-violet light screen greatly prolongs the outdoor life of the adhesive and laminate.

The polymeric o-hydroxybenzophenone compounds derived from styrene polymers prepared as described hereinbefore shows great advantage as relatively inexpensive ultraviolet light absorbers for photostabilization purposes.

Because these compounds are themselves polymeric in nature, the light stabilizing benzophenone component being held to the base polymeric structural unit by means of a chemical bond, there is no exudation or migration of the ultraviolet light absorber to the surface of the ultraviolet light sensitive structure with which it is blended.

Furthermore, the polymeric structures of the present invention, because they have relatively low vapor pressures, are stable when subjected to high processing temperatures and therefore can be extruded or hot solvent cast in combination with other plastic materials in higher concentrations without danger of bleeding out of the system or becoming degraded.

The process of the present invention allows for the preparation of ultraviolet light photostabilizing compounds in a simple one-step operation thereby eliminating the need for the expensive and time-consuming process of preparing an intermediate monomer followed by an additional polymerization step.

Additionally, the starting materials utilized in the present process also are significantly less costly than those normally employed in the preparation of benzophenone derivatives for photostabilization purposes.

In addition to being excellent photostabilizing agents, the compounds prepared by the present process are polymeric chelates and cation scavengers; hence, can find application in areas served by commercial ion exchange resins, e.g., water softening and fuel cells.

What is claimed is:

1. A photostable polymer comprising: a polymeric compound having recurring structural units of the formula:

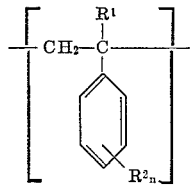

wherein $R^1$ is selected from the group consisting of hydrogen, halogen and alkyl, $R^2$ is selected from the group consisting of hydrogen, halogen, hydroxy, alkoxy and alkyl and $n$ is a positive integer of from 1 to 3 inclusive, wherein at least 10% of said units of said polymeric compound have attached to the benzene ring a radical of the formula:

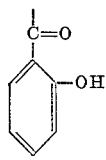

2. The photostable polymer of claim 1 wherein $R^2$ is alkoxy and $n$ is 1.

3. The photostable polymer of claim 1 wherein the polymeric compound is a copolymer of styrene and alphamethyl styrene.

4. A photostable polymer comprising: polystyrene wherein at least 50% of the styrene units have attached to the benzene ring a radical of the formula:

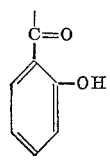

5. A photostable polymeric composition comprising: a blend of (1) a polymeric compound selected from the group consisting of alpha-olefins and a polymer having the general formula:

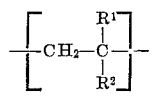

wherein $R^1$ is selected from the group consisting of halogen,

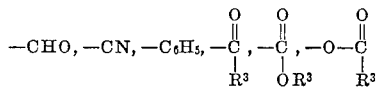

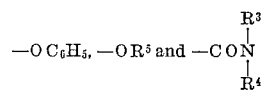

$R^2$ is selected from the group consisting of $R^1$, hydrogen and alkyl of 1–4 carbon atoms, $R^5$ is alkyl and $R^3$ and $R^4$ are selected from the group consisting of hydrogen and alkyl and (2) the polymer of claim 1.

6. The photostable polymeric composition of claim 5 wherein polymeric compound 1 is polyvinyl fluoride.

References Cited

UNITED STATES PATENTS

| | | | |
|---|---|---|---|
| 3,157,709 | 11/1964 | Hock et al. | 260—45.85 |
| 3,219,644 | 11/1965 | Leavitt | 260—93.5 |
| 2,713,570 | 7/1955 | Kenyon et al. | 260—93.5 |
| 2,919,259 | 12/1959 | Naylor et al. | 260—45.85 |

MURRAY TILLMAN, *Primary Examiner.*

J. W. SNOW, *Assistant Examiner.*

U.S. Cl. X.R.

260—875, 896, 897, 898, 899, 901, 88.2, 93.5, 96, 45.85